(12) United States Patent
Liang

(10) Patent No.: US 12,125,168 B2
(45) Date of Patent: Oct. 22, 2024

(54) PHOTOGRAPHING METHOD, APPARATUS AND SYSTEM, AND COMPUTER READABLE STORAGE MEDIUM

(71) Applicant: ZTE Corporation, Shenzhen (CN)

(72) Inventor: Zhen Liang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 145 days.

(21) Appl. No.: 17/605,760

(22) PCT Filed: Jun. 30, 2020

(86) PCT No.: PCT/CN2020/099536
§ 371 (c)(1),
(2) Date: Oct. 22, 2021

(87) PCT Pub. No.: WO2021/051946
PCT Pub. Date: Mar. 25, 2021

(65) Prior Publication Data
US 2022/0215518 A1     Jul. 7, 2022

(30) Foreign Application Priority Data

Sep. 17, 2019  (CN) .......................... 201910877964.7

(51) Int. Cl.
*G06T 5/50* (2006.01)
*H04M 1/72* (2021.01)
*H04N 7/18* (2006.01)

(52) U.S. Cl.
CPC ............... *G06T 5/50* (2013.01); *H04N 7/183* (2013.01); *G06T 2207/30232* (2013.01); *H04M 1/72* (2013.01); *H04M 2250/52* (2013.01)

(58) Field of Classification Search
None
See application file for complete search history.

(56) References Cited

U.S. PATENT DOCUMENTS 9,171,352 B1 *  10/2015  Raynaud ................... G06T 5/92
9,208,548 B1 *  12/2015  Noble ................. G06F 16/5866
(Continued)

FOREIGN PATENT DOCUMENTS

CA      2829597 A1 *  9/2012  ............. G06F 16/58
CN    103024266 A       4/2013
(Continued)

OTHER PUBLICATIONS

European Patent Office. Extended European Search Report for EP Application No. 20865978.9, mailed Aug. 19, 2022, pp. 1-20.
(Continued)

*Primary Examiner* — Ricky Chin
(74) *Attorney, Agent, or Firm* — Vivacqua Crane, PLLC

(57) ABSTRACT

A photographing method, device and system, and a non-transitory computer-readable storage medium are disclosed. The photographing method may include: sending a first image or a feature thereof to a cloud server, where the first image is acquired through a built-in camera of the mobile terminal (100); and receiving a third image from a cloud server, which is determined by the cloud server, in response to meeting a first preset condition based on a second image captured by a camera arranged on-site, and performing detail enhancement on the first image according to the third image which meets the first preset condition, where the first preset condition includes: a capture time interval between the third image and the first image being less than or equal to a preset time interval, and the third image being able to be utilized to enhance the first image partly or entirely (101).

11 Claims, 5 Drawing Sheets

(56) References Cited

U.S. PATENT DOCUMENTS

| | | | | |
|---|---|---|---|---|
| 10,970,330 B1* | 4/2021 | Bhogal | ............... | G06F 3/04845 |
| 2002/0094135 A1* | 7/2002 | Caspi | ........................ | G06T 7/20 |
| | | | | 348/E5.054 |
| 2010/0309226 A1* | 12/2010 | Quack | ..................... | G06F 16/50 |
| | | | | 382/218 |
| 2013/0176442 A1* | 7/2013 | Shuster | ................ | G06T 7/0002 |
| | | | | 348/207.1 |
| 2014/0354853 A1* | 12/2014 | Venkataraman | ....... | H04N 5/265 |
| | | | | 348/239 |
| 2018/0144528 A1* | 5/2018 | Balasubramanian | ........................ | |
| | | | | G06F 16/5866 |
| 2018/0270424 A1* | 9/2018 | Li | ........................ | H04N 17/002 |
| 2021/0407186 A1* | 12/2021 | Del Pero | ............ | G01C 21/3602 |
| 2022/0095009 A1* | 3/2022 | Hong | ..................... | G06F 40/30 |
| 2022/0215518 A1* | 7/2022 | Liang | ..................... | H04N 23/80 |

FOREIGN PATENT DOCUMENTS

| | | |
|---|---|---|
| CN | 104052931 A | 9/2014 |
| CN | 105450931 A | 3/2016 |
| CN | 105635558 A | 6/2016 |
| CN | 106296616 A | 1/2017 |
| CN | 106850964 A | 6/2017 |
| CN | 107205120 A | 9/2017 |
| CN | 107507158 A | 12/2017 |
| CN | 206865646 U | 1/2018 |
| CN | 108564534 A * | 9/2018 |
| JP | 2013050747 A * | 3/2013 |
| KR | 20190088596 A | 7/2019 |

OTHER PUBLICATIONS

The State Intellectual Property Office of People's Republic of China. First Office Action for CN Application No. 2019108779647 and English translation, mailed Oct. 20, 2022, pp. 1-20.
The State Intellectual Property Office of People's Republic of China. First Search Report for CN Application No. 2019108779647 and English translation, mailed Oct. 12, 2022, pp. 1-6.
International Searching Authority. International Search Report and Written Opinion for PCT Application No. PCT/CN2020/099536 and English translation, mailed Aug. 26, 2020, pp. 1-10.

* cited by examiner

PHOTOGRAPHING METHOD, APPARATUS AND SYSTEM, AND COMPUTER READABLE STORAGE MEDIUM

CROSS-REFERENCE TO RELATED APPLICATION

This application is a national stage filing under 35 U.S.C. § 371 of international application number PCT/CN2020/099536, filed Jun. 30, 2020, which claims priority to Chinese patent application No. 201910877964.7 filed on Sep. 17, 2019. The contents of these applications are incorporated herein by reference in their entirety.

TECHNICAL FIELD

The embodiments of the present disclosure relate to but are not limited to the field of photography, in particular to a photographing method, a photographing device, a photographing system, and a non-transitory computer-readable storage medium.

BACKGROUND

Currently, mobile phones use built-in cameras for photographing, and there is also a technology for viewing and capturing images remotely by connecting a webcam (such as a surveillance camera). However, these two technologies do not provide a function for improving pictures taken by users.

There is also a scheme of separating the camera from the body, such as Wi-Fi cameras introduced by some Japanese manufacturers. Such a camera has no conventional camera body, viewfinder, or other components, and is connected to a mobile phone in real time via Wi-Fi, and takes pictures with a screen of the mobile phone as a viewfinder and controller. In this scheme, the camera and photosensitive elements are simply connected to the mobile phone through Wi-Fi, and the camera itself needs to be carried around, which is not convenient.

SUMMARY

An embodiment of the present disclosure provides a photographing method, a photographing device, a photographing system, and a non-transitory computer-readable storage medium, aiming at solving, at least to a certain extent, one of the technical problems in existing technologies.

An embodiment of the present disclosure provides a photographing method applicable to a mobile terminal, the method may include: sending a first image or a feature of the first image to a cloud server, where the first image is an image acquired through a built-in camera of the mobile terminal; and receiving a third image from a cloud server, which is determined by the cloud server, in response to meeting a first preset condition based on a second image captured by a camera arranged on-site, and performing detail enhancement on the first image according to the third image which meets the first preset condition, where the first preset condition includes: a capture time interval between the third image and the first image being less than or equal to a preset time interval, and the third image being able to be utilized to enhance the first image partly or entirely.

An embodiment of the present disclosure provides a photographing method applicable to a mobile terminal, the method may include: sending a first image or a feature of the first image to a cloud server, where the first image is an image acquired through a built-in camera of the mobile terminal; and establishing a connection with a camera arranged on-site which meets a second preset condition, receiving a second image captured by the camera which meets the second preset condition, and performing detail enhancement on the first image according to the received second image, where the second image captured by the camera which meets the second preset condition is able to be utilized to enhance the first image partly or entirely.

An embodiment of the present disclosure provides a photographing method applicable to a cloud server, the method may include: receiving a first image or a feature of the first image from a mobile terminal, where the first image is an image acquired through a built-in camera of the mobile terminal; receiving a second image captured by a camera arranged on-site; and in response to a determination, based on the captured second image, of a third image which meets a first preset condition, sending the third image which meets the first preset condition to the mobile terminal, where the first preset condition includes: a capture time interval between the third image and the first image being less than or equal to a preset time interval, and the third image being able to be utilized to enhance the first image partly or entirely.

An embodiment of the present disclosure provides a photographing method applicable to a cloud server, the method may include: receiving a first image or a feature of the first image from a mobile terminal, where the first image is an image acquired through a built-in camera of the mobile terminal; receiving a second image captured by a camera arranged on-site; and determining whether the camera meets a second preset condition based on the captured second image, and establishing a connection between the camera and the mobile terminal in response to the camera meeting the second preset condition, where the second image captured by the camera which meets the second preset condition is able to be utilized to enhance the first image partly or entirely.

An embodiment of the present disclosure provides a photographing device, which may include a processor and a non-transitory computer-readable storage medium storing instructions which, when executed by the processor, cause the processor to perform any one of the photographing methods above.

An embodiment of the present disclosure provides a non-transitory computer-readable storage medium storing a computer program which, when executed by a processor, causes the processor to perform the steps of any one of the photographing methods above.

An embodiment of the present disclosure provides a photographing device, the device may include: a first communication module configured to send a first image or a feature of the first image to a cloud server, where the first image is an image acquired through a built-in camera of the photographing device, and to receive a third image from a cloud server, which is determined by the cloud server, in response to meeting a first preset condition based on a second image captured by a camera arranged on-site; and a first image processing module configured to perform detail enhancement on the first image according to the third image which meets the first preset condition, where the first preset condition includes: a capture time interval between the third image and the first image being less than or equal to a preset time interval, and the third image being able to be utilized to enhance the first image partly or entirely.

An embodiment of the present disclosure provides a photographing device, the device may include: a second communication module configured to send a first image or a feature of the first image to a cloud server, where the first image is an image acquired through a built-in camera of the photographing device, and to establish a connection with a camera arranged on-site which meets a second preset condition, and to receive a second image captured by the camera which meets the second preset condition; and a second image processing module configured to perform detail enhancement on the first image according to the received second image, where the second image captured by the camera which meets the second preset condition is able to be utilized to enhance the first image partly or entirely.

An embodiment of the present disclosure provides a photographing device, the device may include: a third communication module configured to receive a first image or a feature of the first image from a mobile terminal, where the first image is an image acquired through a built-in camera of the mobile terminal, to receive a second image captured by a camera arranged on-site, and to send a third image which meets a first preset condition to the mobile terminal; and an image determination module configured to determine the third image which meets the first preset condition based on the captured second image, in response to the third image meeting the first preset condition, where the first preset condition includes: a capture time interval between the third image and the first image being less than or equal to a preset time interval, and the third image being able to be utilized to enhance the first image partly or entirely.

An embodiment of the present disclosure provides a photographing device, the device may include: a fourth communication module configured to receive a first image or a feature of the first image from a mobile terminal, where the first image is an image acquired through a built-in camera of the mobile terminal, to receive a second image captured by a camera arranged on-site, and to establish a connection between the camera and the mobile terminal in response to the camera meeting a second preset condition; and a camera determination module configured to determine whether the camera meets the second preset condition based on the captured second image, where the second image captured by the camera which meets the second preset condition is able to be utilized to enhance the first image partly or entirely.

An embodiment of the present disclosure provides a photographing system, the system may include a mobile terminal, N camera(s) arranged on-site and a cloud server, where the mobile terminal is configured to send a first image or a feature of the first image to the cloud server, where the first image is an image acquired through a built-in camera of the mobile terminal, to receive a third image from a cloud server, which is determined by the cloud server to meet a first preset condition based on a second image captured by the camera(s) arranged on-site, and to perform detail enhancement on the first image according to the third image which meets the first preset condition, where the first preset condition includes: a capture time interval between the third image and the first image being less than or equal to a preset time interval, and the third image being able to be utilized to enhance the first image partly or entirely; the N camera(s) arranged on-site is configured to periodically send a captured second image to the cloud server, where N is an integer greater than or equal to 1; and the cloud server is configured to receive the first image or the feature of the first image from the mobile terminal, and to receive the second image captured by the camera(s) fixedly located on-site, to determine, based on the captured second image, the third image which meets the first preset condition, and to send the third image which meets the first preset condition to the mobile terminal.

An embodiment of the present disclosure provides A photographing system, the system may include a mobile terminal, N camera(s) arranged on-site and a cloud server, where the mobile terminal is configured to send a first image or a feature of the first image to the cloud server, where the first image is an image acquired through a built-in camera of the mobile terminal, to establish a connection with a camera which meets a second preset condition among the camera(s) arranged on-site, to receive a second image captured by the camera which meets the second preset condition, and to perform detail enhancement on the first image according to the received second image; the N camera(s) arranged on-site is configured to periodically send a captured second image to the cloud server, where N is an integer greater than or equal to 1; the cloud server is configured to receive the first image or the feature of the first image from the mobile terminal, where the first image is the image acquired through the built-in camera of the mobile terminal, to receive the second image captured by the camera(s) arranged on-site; and to determine a camera which meets a second preset condition among the camera(s) according to the captured second image, and to establish a connection between the camera which meets the second preset condition and the mobile terminal; and the camera which meets the second preset condition is configured to send the captured second image to the mobile terminal after the connection with the mobile terminal is established, where the second image captured by the camera which meets the second preset condition is able to be utilized to enhance the first image partly or entirely.

Additional features and advantages of the embodiments of the present disclosure will be set forth in the subsequent description, and in part will become apparent from the description, or may be learned by practice of the embodiments of the present disclosure. The purposes and other advantages of the embodiments of the present disclosure can be realized and obtained by structures particularly noted in the description, the claims and the accompanying drawings.

BRIEF DESCRIPTION OF DRAWINGS

The accompanying drawings are used to provide a further understanding of the technical schemes of the embodiments of the present disclosure and constitute a part of the description. The accompanying drawings are used to explain the technical schemes of the embodiments of the present disclosure together with the embodiments of the present disclosure, and do not constitute a restriction on the technical schemes of the embodiments of the present disclosure.

DETAILED DESCRIPTION

Hereinafter, embodiments of the present disclosure will be described in detail with reference to the accompanying drawings. It should be noted that any combinations of embodiments and features of the embodiments of the present disclosure without conflict are possible.

The steps shown in the flowcharts of the drawings may be performed in a computer system, such as with a set of computer-executable instructions. Moreover, although a logical order is shown in the flowcharts, the steps shown or described may be performed, in some cases, in a different order than shown or described herein.

Figure 1:
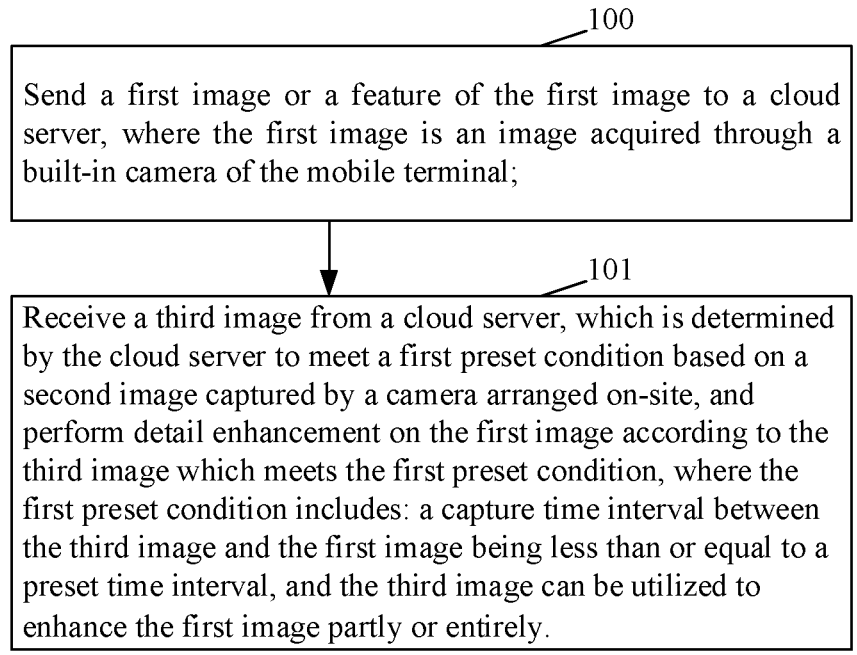
FIG. 1 is a flowchart of a photographing method according to an embodiment of the present disclosure.

Referring to FIG. 1, an embodiment of the present disclosure provides a photographing method applicable to a mobile terminal, the method including the following steps.

At step 100, a first image or a feature of the first image is sent to a cloud server, where the first image is an image acquired through a built-in camera of the mobile terminal.

In an example embodiment, the first image is an image obtained during by a preview process during photographing through the built-in camera of the mobile terminal, or an image captured by the built-in camera of the mobile terminal.

At step 101, a third image which is determined based on one or more second images captured by one or more cameras arranged on-site and meets a first preset condition is received from the cloud server, and detail enhancement is performed on the first image according to the third image which meets the first preset condition, where the first preset condition includes: a capture time interval between the third image and the first image being less than or equal to a preset time interval, and the third image can be utilized to enhance the first image partly or entirely.

In an embodiment of the present disclosure, the one or more cameras may be located at photogenic spots, popular places for taking pictures, etc., and multiple cameras or only one camera may be arranged at one location according to actual needs.

In another embodiment of the present disclosure, the first preset condition further includes at least one of: a distance between the camera capturing the third image and the mobile terminal being less than or equal to a first preset threshold, which restricts a shooting position of the mobile terminal within a certain distance from the fixedly located camera; or the third image including no area where confidentiality is required or photography is prohibited.

In an embodiment of the present disclosure, the third image can be utilized to enhance the first image partly or entirely includes one of: a matching degree between the third image and the first image or the feature of the first image being greater than or equal to a second preset threshold; or the third image can be utilized to enhance the first image partly.

In an embodiment of the present disclosure, to determine whether the third image can enhance the first image partly, the third image can be matched to a part of the first image. If the matching degree between the third image and the part of the first image is greater than or equal to the second preset threshold, it is indicated that the third image can enhance the first image partly.

In an embodiment of the present disclosure, when the detail enhancement is to be performed on the first image according to the third image which meets the first preset condition, the third image may be registered to the first image firstly (for example, using common methods such as image edge detection and alignment) to identify feature edges and objects in the images; relative positions of the objects are used to determine whether there exist parts with common contents in the two images and the parts are different from each other and help to align the images; and then, the parts with common contents are aligned according to parameters such as the size, exposure, and angle of rotation of the two images, and the parts with common contents in the two images are fused to finally obtain an image with higher definition.

In addition, due to different shooting angles or orientations, there will be parallax between objects. Entity segmentation or semantic segmentation may be used to increase the details of each object identified in an image with each entity, instead of being limited to an overall matching algorithm executed on the entire image, so as to achieve better detail enhancement.

According to the embodiments of the present disclosure, the details of the first image captured by the mobile terminal are enhanced by using the second image captured by the camera arranged on-site, so that the first image captured by the mobile terminal becomes more clearer, that is, the photographing quality of the mobile terminal is improved. As the user need not carry around the camera for capturing the second image, the portability of the mobile terminal is ensured while improving the photographing quality of the mobile terminal.

For example, recently, some media reported that a high-definition picture of the moon shot by a camera was actually a fixed moon preset template merged into the picture using AI after the shooting. Although different parties held different opinions later and some thought that it was a reasonable image enhancement technique, anyway, the effect made the final picture content, especially the moon part, not reflect the actual real-time content of the photographed object. Therefore, if the methods proposed by the embodiments of the present disclosure are used instead, public cameras are placed in cities in advance, and when a user is photographing the sky, the corresponding sky image content is transmitted back in real time through 5G, then a real high-definition moon photo can be synthesized.

Similarly, in some popular places, such as at special angles of viewing at tourist attractions, users can be provided with image enhancement camera data to help the users take clearer photos.

Figure 2:
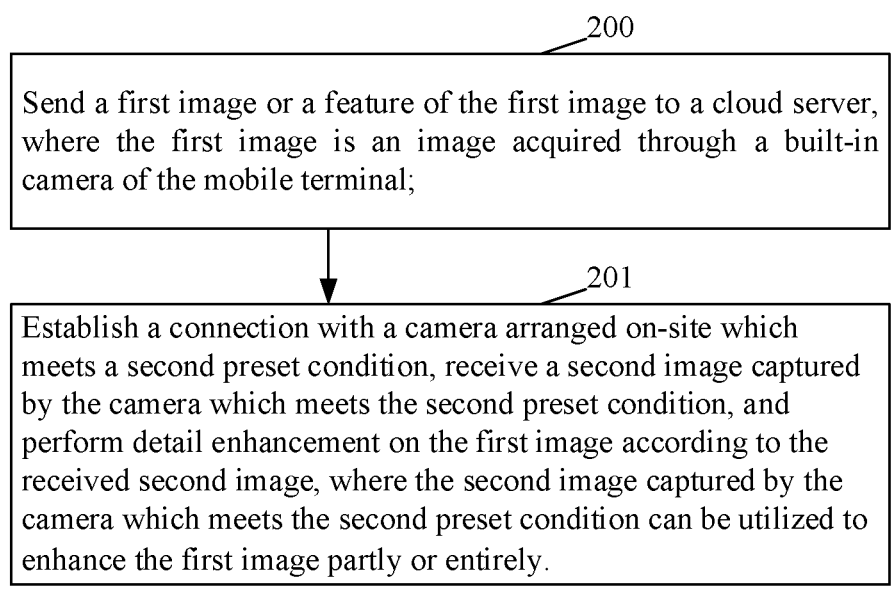
FIG. 2 is a flowchart of a photographing method according to another embodiment of the present disclosure.

Referring to FIG. 2, another embodiment of the present disclosure provides a photographing method applicable to a mobile terminal, the method including the following steps.

At step 200, a first image or a feature of the first image is sent to a cloud server, where the first image is an image acquired through a built-in camera of the mobile terminal.

In an example embodiment, the first image is an image obtained by a preview process during photographing through the built-in camera of the mobile terminal or an image captured by the built-in camera of the mobile terminal.

At step 201, a connection with a camera among one or more cameras arranged on-site which meets a second preset condition is established, a second image captured by the camera which meets the second preset condition is received, and detail enhancement is performed on the first image according to the second image received, where the second image captured by the camera which meets the second preset condition can enhance the first image partly or entirely.

In an embodiment of the present disclosure, the one or more cameras may be located at photogenic spots, popular places for taking pictures, etc., and multiple cameras or only one camera may be arranged at one location according to actual needs.

In another embodiment of the present disclosure, the preset condition includes at least one of: a distance between the camera which meets the second preset condition and the mobile terminal being less than or equal to a first preset threshold; or the second image captured by the camera which meets the second preset condition including no area where confidentiality is required or photography is prohibited.

In an embodiment of the present disclosure, to determine whether the second image captured by the camera which meets the second preset condition can enhance the first image partly or entirely, a second image captured by the camera may be matched to the first image, where a capture time interval between the first image and the second image is less than or equal to the preset time interval. If the matching degree between the two images is greater than or equal to the second preset threshold, it is indicated that the camera meets the second preset condition; or, it is determined whether the second image can enhance the first image partly, and if the answer is yes, it is indicated that the camera meets the second preset condition.

In an embodiment of the present disclosure, to determine whether the second image can enhance the first image partly, the second image can be matched to a part of the first image. If the matching degree between the second image and the part of the first image is greater than or equal to the second preset threshold, it is indicated that the second image can enhance the first image partly.

In an embodiment of the present disclosure, when the detail enhancement is to be performed on the first image according to the received second image captured by the camera which meets the second preset condition, the second image may be registered to the first image firstly (for example, using common methods such as image edge detection and alignment) to identify feature edges and objects in the images; relative positions of the objects are used to determine whether there exist parts with common contents in the two images and the parts are different from each other and help to align the images; and then, the parts with common contents are aligned according to parameters such as the size, exposure, and angle of rotation of the two images, and the parts with common contents in the two images are fused to finally obtain an image with higher definition.

In addition, due to different shooting angles, there will be parallax between objects. Entity segmentation or semantic segmentation may be used to increase the details of each object with each entity, instead of being limited to a one-time matching algorithm of the whole images, so as to achieve better detail enhancement.

According to the embodiments of the present disclosure, the details of the first image captured by the mobile terminal are enhanced by using the second image captured by the camera arranged on-site, so that the first image captured by the mobile terminal becomes clearer, that is, the photographing quality of the mobile terminal is improved. As the user need not carry around the camera for capturing the second image, the portability of the mobile terminal is ensured while improving the photographing quality of the mobile terminal.

Figure 3:
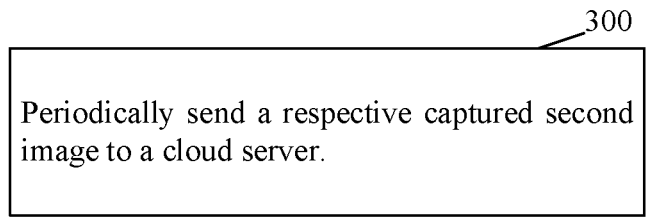
FIG. 3 is a flowchart of a photographing method according to another embodiment of the present disclosure.

Referring to FIG. 3, another embodiment of the present disclosure provides a photographing method applicable to a camera fixedly located, the method including:

At step 300, one or more captured second images are periodically sent to a cloud server.

In another embodiment of the present disclosure, the method further includes: sending the one or more captured second images to the mobile terminal after the connection with the mobile terminal is established.

Figure 4:
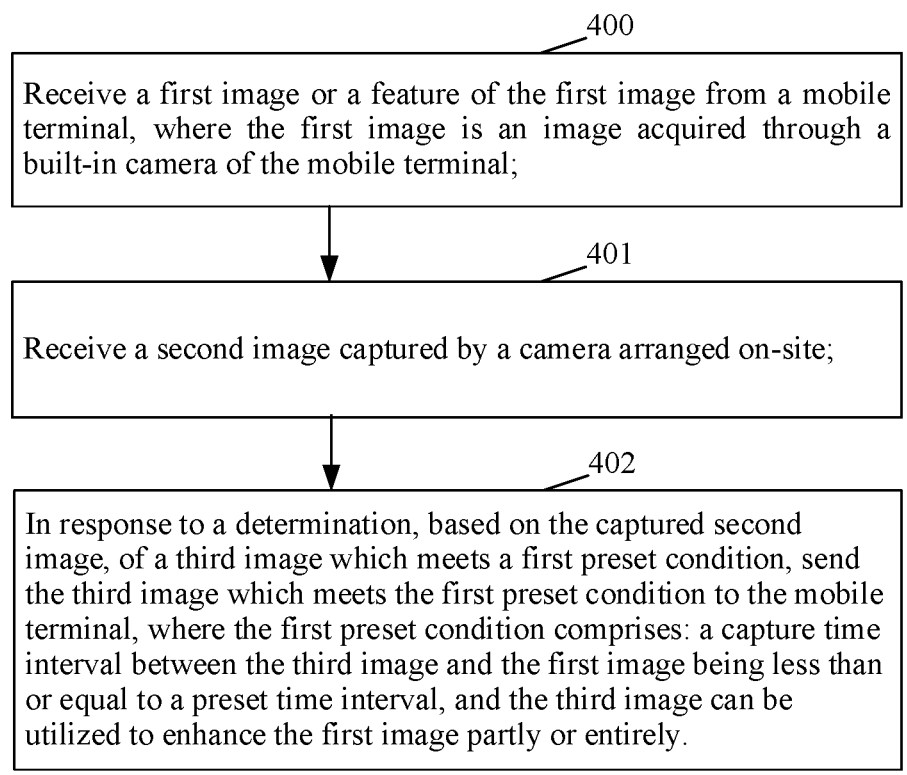
FIG. 4 is a flowchart of a photographing method according to another embodiment of the present disclosure.

Referring to FIG. 4, another embodiment of the present disclosure provides a photographing method applicable to a cloud server, the method including the following steps.

At step 400, a first image or a feature of the first image from a mobile terminal is received, where the first image is an image acquired through a built-in camera of the mobile terminal.

In an example embodiment, the first image is an image obtained by a preview process during photographing through the built-in camera of the mobile terminal, or an image captured by the built-in camera of the mobile terminal.

At step 401, one or more second images captured by one or more cameras arranged on-site are received.

In an embodiment of the present disclosure, the one or more cameras may be located at photogenic spots, popular places for taking pictures, etc., and multiple cameras or only one camera may be arranged at one location according to actual needs.

At step 402, a third image which meets a first preset condition is determined based on the one or more captured second images, and the third image which meets the first preset condition is sent to the mobile terminal, where the first preset condition includes: a capture time interval between the third image and the first image being less than or equal to a preset time interval, and the third image can be utilized to enhance the first image partly or entirely.

In an embodiment of the present disclosure, the third image which meets the first preset condition may be determined in either of the following approaches.

In a first approach, the one or more captured second images are by default not panoramic images but ordinary two-dimensional images, so the second image meeting the first preset condition can be directly selected from the one or more captured second images as the third image meeting the first preset condition.

In a second approach, the one or more second images captured by the camera may or may not be panoramic. Therefore, before determining the third image which meets the first preset condition, it is necessary to determine whether the one or more captured second images are panoramic before proceeding with the subsequent process.

If the one or more captured second images are not panoramic, the second image meeting the first preset condition can be directly selected from the one or more captured second images as the third image meeting the first preset condition.

If the one or more captured second images are panoramic, the one or more captured second images may be converted into third images, where an included angle between a shooting orientation of a third image and a shooting orientation of the first image is less than or equal to a third preset threshold, and the third image which meets the first preset condition may be selected from the third images acquired by the conversion.

In another embodiment of the present disclosure, the first preset condition further includes at least one of: a distance between the camera capturing the third image and the mobile terminal being less than or equal to a first preset threshold, which restricts a shooting position of the mobile terminal within a certain distance from the fixedly located camera; or the third image including no area where confidentiality is required or photography is prohibited.

In an embodiment of the present disclosure, the third image can be utilized to enhance the first image partly or entirely includes one of: a matching degree between the third image and the first image or the feature of the first image being greater than or equal to a second preset threshold; or the third image can be utilized to enhance the first image partly.

In an embodiment of the present disclosure, to determine whether the third image can enhance the first image partly, the third image can be matched to a part of the first image. If the matching degree between the third image and the part of the first image is greater than or equal to the second preset threshold, it is indicated that the third image can enhance the first image partly.

Figure 5:
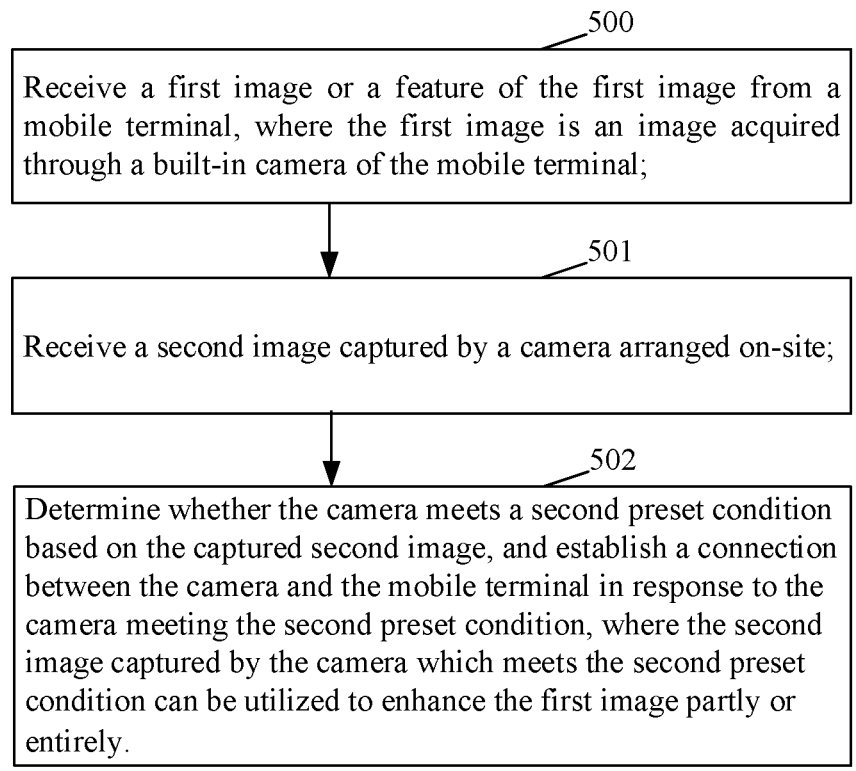
FIG. 5 is a flowchart of a photographing method according to another embodiment of the present disclosure.

Referring to FIG. 5, another embodiment of the present disclosure provides a photographing method applicable to a cloud server, the method including the following steps.

At step 500, a first image or a feature of the first image from a mobile terminal is received, where the first image is an image acquired through a built-in camera of the mobile terminal.

In an example embodiment, the first image is an image obtained by a preview process during photographing through the built-in camera of the mobile terminal, or an image captured by the built-in camera of the mobile terminal.

At step 501, one or more second images captured by one or more cameras arranged on-site are received.

In an embodiment of the present disclosure, the one or more cameras may be located at photogenic spots, popular places for taking pictures, etc., and multiple cameras or only one camera may be arranged at one location according to actual needs.

At step 502, a camera which meets a second preset condition, among the one or more cameras, is determined according to the one or more captured second images, and a connection is established between the camera which meets the second preset condition and the mobile terminal, where at least one of the second images captured by the camera which meets the second preset condition can enhance the first image partly or entirely.

In another embodiment of the present disclosure, the preset condition includes at least one of: a distance between the camera which meets the second preset condition and the mobile terminal being less than or equal to a first preset threshold; or the second image captured by the camera which meets the second preset condition including no area where confidentiality is required or photography is prohibited.

In an embodiment of the present disclosure, to determine whether the second image captured by the camera which meets the second preset condition can enhance the first image partly or entirely, a second image captured by the camera may be matched to the first image, where a capture time interval between the first image and the second image is less than or equal to the preset time interval. If the matching degree between the two images is greater than or equal to the second preset threshold, it is indicated that the camera meets the second preset condition; or, it is determined whether the second image can enhance the first image partly, and if the answer is yes, it is indicated that the camera meets the second preset condition.

In an embodiment of the present disclosure, to determine whether the second image can enhance the first image partly, the second image can be matched to a part of the first image. If the matching degree between the second image and the part of the first image is greater than or equal to the second preset threshold, it is indicated that the second image can enhance the first image partly.

Figure 13:
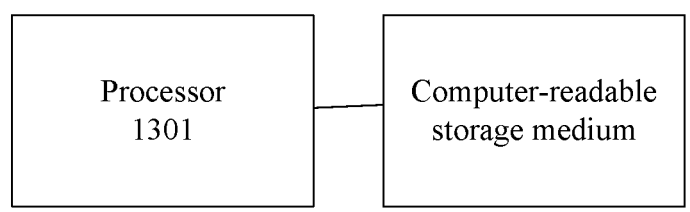
FIG. 13 is a schematic diagram of the structure of a photographing device according to an embodiment of the present disclosure.

Referring to FIG. 13, another embodiment of the present disclosure provides a photographing device, including a processor 1301 and a non-transitory computer-readable storage medium storing instructions which, when executed by the processor 1301, cause the processor to perform any one of the above photographing methods.

Another embodiment of the present disclosure provides a non-transitory computer-readable storage medium storing a computer program which, when executed by a processor, causes the processor to perform the steps of any one of the above photographing methods.

Figure 6:
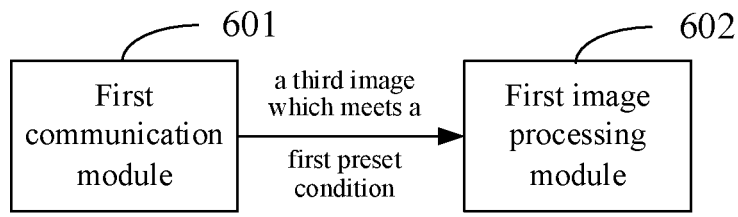
FIG. 6 is a schematic diagram of the structure of a photographing device according to another embodiment of the present disclosure.

Referring to FIG. 6, another embodiment of the present disclosure provides a photographing device (such as a mobile terminal), including: a first communication module 601 configured to send a first image or a feature of the first image to a cloud server, where the first image is an image acquired through a built-in camera of the photographing device, and to receive from the cloud server a third image which is determined based on one or more second images captured by one or more cameras arranged on-site and meets a first preset condition; and a first image processing module 602 configured to perform detail enhancement on the first image according to the third image which meets the first preset condition, where the first preset condition includes: a capture time interval between the third image and the first image being less than or equal to a preset time interval, and the third image can be utilized to enhance the first image partly or entirely.

In an example embodiment, the first image is an image obtained by a preview process during photographing through the built-in camera of the mobile terminal or an image captured by the built-in camera of the mobile terminal.

In an embodiment of the present disclosure, the one or more cameras may be located at photogenic spots, popular places for taking pictures, etc., and multiple cameras or only one camera may be arranged at one location according to actual needs.

In another embodiment of the present disclosure, the first preset condition further includes at least one of: a distance between the camera capturing the third image and the mobile terminal being less than or equal to a first preset threshold, which restricts a shooting position of the mobile terminal within a certain distance from the fixedly located camera; or the third image including no area where confidentiality is required or photography is prohibited.

In an embodiment of the present disclosure, the third image can be utilized to enhance the first image partly or entirely includes one of: a matching degree between the third image and the first image or the feature of the first image being greater than or equal to a second preset threshold; or the third image can be utilized to enhance the first image partly.

In an embodiment of the present disclosure, when the first image processing module 602 is to perform the detail enhancement on the first image according to the third image which meets the first preset condition, the third image may be registered to the first image firstly (for example, using common methods such as image edge detection and alignment) to identify feature edges and objects in the images; relative positions of the objects are used to determine whether there exist parts with common contents in the two images and the parts are different from each other, and help to align the images; and then, the parts with common contents are aligned according to parameters such as the size, exposure, and angle of rotation of the two images, and the parts with common contents in the two images are fused to finally obtain an image with higher definition.

In addition, due to different shooting angles, there will be parallax between objects. Entity segmentation or semantic segmentation may be used to increase the details of each object with each entity, instead of being limited to a one-time matching algorithm of the whole images, so as to achieve better detail enhancement.

According to the embodiments of the present disclosure, the details of the first image captured by the mobile terminal are enhanced by using the second image captured by the camera arranged on-site, so that the first image captured by the mobile terminal becomes clearer, that is, the photographing quality of the mobile terminal is improved. As the user need not carry around the camera for capturing the second image, the portability of the mobile terminal is ensured while improving the photographing quality of the mobile terminal.

Figure 7:
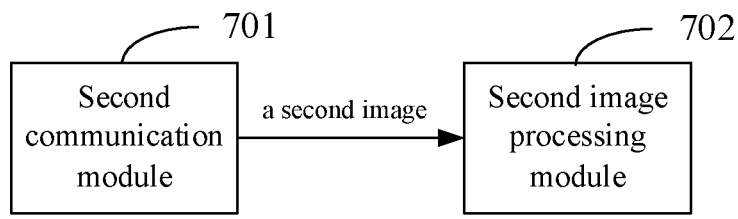
FIG. 7 is a schematic diagram of the structure of a photographing device according to another embodiment of the present disclosure.

Referring to FIG. 7, another embodiment of the present disclosure provides a photographing device (such as a mobile terminal), including: a second communication module 701 configured to send a first image or a feature of the first image to a cloud server, where the first image is an image acquired through a built-in camera of the photographing device, and to establish a connection with a camera among one or more cameras arranged on-site which meets a second preset condition, and to receive a second image captured by the camera which meets the second preset condition; and a second image processing module 702 configured to perform detail enhancement on the first image according to the received second image, where the second image captured by the camera which meets the second preset condition can enhance the first image partly or entirely.

In an example embodiment, the first image is an image obtained by a preview process during photographing through the built-in camera of the mobile terminal or an image captured by the built-in camera of the mobile terminal.

In an embodiment of the present disclosure, the one or more cameras may be located at photogenic spots, popular places for taking pictures, etc., and multiple cameras or only one camera may be arranged at one location according to actual needs.

In another embodiment of the present disclosure, the preset condition includes at least one of: a distance between the camera which meets the second preset condition and the mobile terminal being less than or equal to a first preset threshold; or the second image captured by the camera which meets the second preset condition including no area where confidentiality is required or photography is prohibited.

In an embodiment of the present disclosure, when the second image processing module 702 is to perform the detail enhancement on the first image according to the received second image captured by the camera which meets the second preset condition, the second image may be registered to the first image firstly (for example, using common methods such as image edge detection and alignment) to identify feature edges and objects in the images; relative positions of the objects are used to determine whether there exist parts with common contents in the two images and the parts are different from each other, and help to align the images; and then, the parts with common contents are aligned according to parameters such as the size, exposure, and angle of rotation of the two images, and the parts with common contents in the two images are fused to finally obtain an image with higher definition.

In addition, due to different shooting angles, there will be parallax between objects. Entity segmentation or semantic segmentation may be used to increase the details of each object with each entity, instead of being limited to a one-time matching algorithm of the whole images, so as to achieve better detail enhancement.

According to the embodiments of the present disclosure, the details of the first image captured by the mobile terminal are enhanced by using the second image captured by the camera arranged on-site, so that the first image captured by the mobile terminal becomes clearer, that is, the photographing quality of the mobile terminal is improved. As the user need not carry around the camera for capturing the second image, the portability of the mobile terminal is ensured while improving the photographing quality of the mobile terminal.

Figure 8:
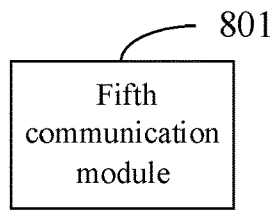
FIG. 8 is a schematic diagram of the structure of a photographing device according to another embodiment of the present disclosure.

Referring to FIG. 8, another embodiment of the present disclosure provides a photographing device (such as a camera fixedly located on-site), including: a fifth communication module 801 configured to periodically send second images captured to a cloud server.

In another embodiment of the present disclosure, the second communication module 801 is further configured to: send the captured second image to the mobile terminal after the connection with the mobile terminal is established.

Figure 9:
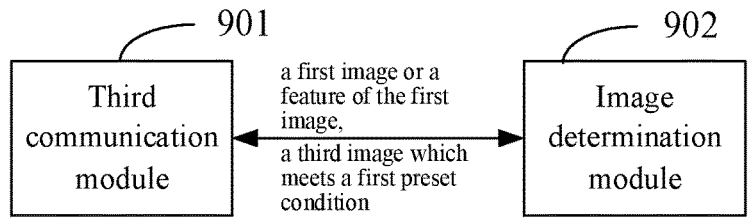
FIG. 9 is a schematic diagram of the structure of a photographing device according to another embodiment of the present disclosure.

Referring to FIG. 9, another embodiment of the present disclosure provides a photographing device (such as a cloud server), including: a third communication module 901 configured to receive a first image or a feature of the first image from a mobile terminal, where the first image is an image acquired through a built-in camera of the mobile terminal, to receive one or more second images captured by one or more cameras arranged on-site, and to send a third image which meets a first preset condition to the mobile terminal; and an image determination module 902 configured to determine, based on the one or more captured second images, the third image which meets the first preset condition, and to send the third image which meets the first preset condition to the mobile terminal, where the first preset condition includes: a capture time interval between the third image and the first image being less than or equal to a preset time interval, and the third image can be utilized to enhance the first image partly or entirely.

In an embodiment of the present disclosure, the image determination module 902 may determine the third image which meets the first preset condition in either of the following approaches.

In a first approach, the one or more captured second images are by default not panoramic images but ordinary two-dimensional images, so the second image meeting the first preset condition can be directly selected from the one or more captured second images as the third image meeting the first preset condition.

In a second approach, the one or more second images captured by the camera may or may not be panoramic. Therefore, before determining the third image which meets the first preset condition, it is necessary to determine whether the one or more captured second images are panoramic before proceeding with the subsequent process.

Specifically, if the captured one or more second images are not panoramic, the second image meeting the first preset condition can be directly selected from the one or more captured second images as the third image meeting the first preset condition.

If the one or more captured second images are panoramic, the one or more captured second images may be converted into third images, where an included angle between a shooting orientation of the third images and a shooting orientation of the first image is less than or equal to a third preset threshold, and the third image which meets the first preset condition may be selected from the third images acquired by the conversion.

In an embodiment of the present disclosure, the one or more cameras may be located at photogenic spots, popular places for taking pictures, etc., and multiple cameras or only one camera may be arranged at one location according to actual needs.

In another embodiment of the present disclosure, the first preset condition further includes at least one of: a distance between the camera capturing the third image and the mobile terminal being less than or equal to a first preset threshold, which restricts a shooting position of the mobile terminal within a certain distance from the fixedly located camera; or the third image including no area where confidentiality is required or photography is prohibited.

In an embodiment of the present disclosure, the third image can be utilized to enhance the first image partly or entirely includes one of: a matching degree between the third image and the first image or the feature of the first image being greater than or equal to a second preset threshold; or the third image can be utilized to enhance the first image partly.

In an embodiment of the present disclosure, when the image determination module 902 is to determine whether the third image can enhance the first image partly, the third image can be matched to a part of the first image. If the matching degree between the third image and the part of the first image is greater than or equal to the second preset threshold, it is indicated that the third image can enhance the first image partly.

Figure 10:
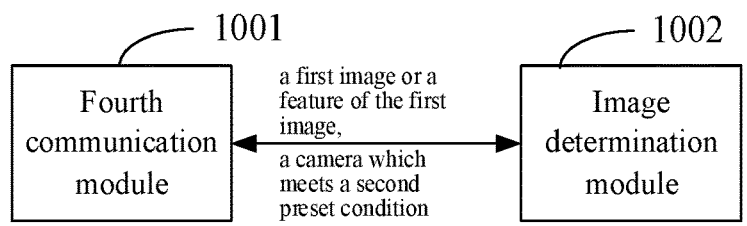
FIG. 10 is a schematic diagram of the structure of a photographing device according to another embodiment of the present disclosure.

Referring to FIG. 10, another embodiment of the present disclosure provides a photographing device (such as a cloud server), including: a fourth communication module 1001 configured to receive a first image or a feature of the first image from a mobile terminal, where the first image is an image acquired through a built-in camera of the mobile terminal, to receive one or more second images captured by one or more cameras arranged on-site, and to establish a connection between a camera among the one or more cameras arranged on-site which meets a second preset condition and the mobile terminal; and a camera determination module 1002 configured to determine the camera which meets the second preset condition according to the one or more captured second images, where at least one of the second images captured by the camera which meets the second preset condition can enhance the first image partly or entirely.

In an example embodiment, the first image is an image obtained by a preview process during photographing through the built-in camera of the mobile terminal or an image captured by the built-in camera of the mobile terminal.

In an embodiment of the present disclosure, the one or more cameras may be located at photogenic spots, popular places for taking pictures, etc., and multiple cameras or only one camera may be arranged at one location according to actual needs.

In another embodiment of the present disclosure, the preset condition includes at least one of: a distance between the camera which meets the second preset condition and the mobile terminal being less than or equal to a first preset threshold; or the second image captured by the camera which meets the second preset condition including no area where confidentiality is required or photography is prohibited.

In an embodiment of the present disclosure, when the determination module 1002 is to determine whether the second image captured by the camera which meets the second preset condition can enhance the first image partly or entirely, a second image captured by the camera may be matched to the first image, where a capture time interval between the first image and the second image is less than or equal to the preset time interval. If the matching degree between the two images is greater than or equal to the second preset threshold, it is indicated that the camera meets the second preset condition; or, it is determined whether the second image can enhance the first image partly, and if the answer is yes, it is indicated that the camera meets the second preset condition.

In an embodiment of the present disclosure, when the camera determination module 1002 is to determine whether the second image can enhance the first image partly, the second image can be matched to a part of the first image. If the matching degree between the second image and the part of the first image is greater than or equal to the second preset threshold, it is indicated that the second image can enhance the first image partly.

Figure 11:
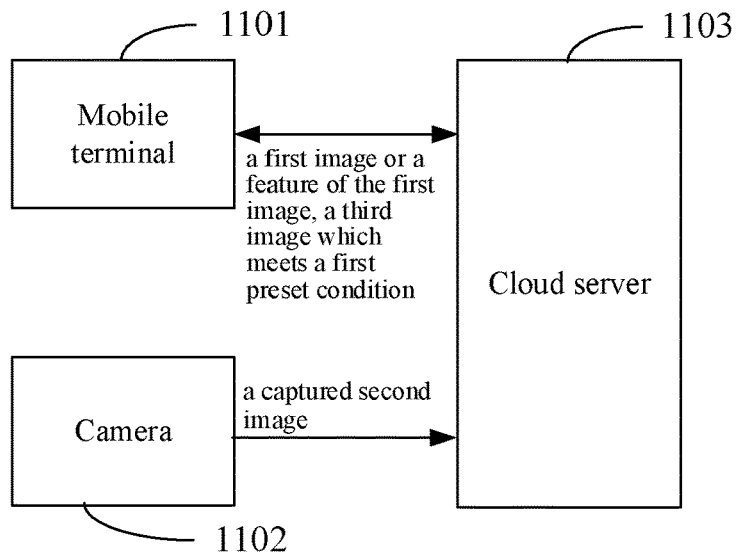
FIG. 11 is a schematic diagram of the structure of a photographing system according to another embodiment of the present disclosure.

Referring to FIG. 11, another embodiment of the present disclosure provides a photographing system, including a mobile terminal 1101, N camera(s) 1102 arranged on-site and a cloud server 1103, where the mobile terminal 1101 is configured to send a first image or a feature of the first image to the cloud server, where the first image is an image acquired through a built-in camera of the mobile terminal, to receive from the cloud server a third image which is determined based on one or more second images captured by the camera(s) arranged on-site and meets a first preset condition, and to perform detail enhancement on the first image according to the third image which meets the first preset condition, where the first preset condition includes: a capture time interval between the third image and the first image being less than or equal to a preset time interval, and the third image can be utilized to enhance the first image partly or entirely; the N camera(s) 1102 arranged on-site is/are configured to periodically send the captured one or more second images to the cloud server, where N is an integer greater than or equal to 1; and the cloud server 1103 is configured to receive the first image or the feature of the first image from the mobile terminal, to receive the one or more second images captured by the camera(s) arranged on-site, to determine, based on the one or more captured second images, the third image which meets the first preset condition, and to send the third image which meets the first preset condition to the mobile terminal.

In an embodiment of the present disclosure, the camera(s) may be located at photogenic spots, popular places for taking pictures, etc., and multiple cameras or only one camera may be arranged at one location according to actual needs.

In an embodiment of the present disclosure, the cloud server 1103 may determine the third image which meets the first preset condition in either of the following approaches.

In a first approach, the captured second image are by default not panoramic images but ordinary two-dimensional images, so the second image meeting the first preset condition can be directly selected from the captured second image as the third image meeting the first preset condition.

In a second approach, the one or more second images captured by the camera may or may not be panoramic. Therefore, before determining the third image which meets the first preset condition, it is necessary to determine whether the captured second image are panoramic before proceeding with the subsequent process.

Specifically, if the captured second image are not panoramic, the second image meeting the first preset condition can be directly selected from the captured second image as the third image meeting the first preset condition.

If the one or more captured second images are panoramic, the one or more captured second images may be converted into third images, where an included angle between a shooting orientation of the third images and a shooting orientation of the first image is less than or equal to a third preset threshold, and the third image which meets the first preset condition may be selected from the third images acquired by the conversion.

In another embodiment of the present disclosure, the first preset condition further includes at least one of: a distance between the camera capturing the third image and the mobile terminal being less than or equal to a first preset threshold, which restricts a shooting position of the mobile terminal within a certain distance from the fixedly located camera; or the third image including no area where confidentiality is required or photography is prohibited.

In an embodiment of the present disclosure, the third image can be utilized to enhance the first image partly or entirely includes one of: a matching degree between the third image and the first image or the feature of the first image being greater than or equal to a second preset threshold; or the third image can be utilized to enhance the first image partly.

In an embodiment of the present disclosure, when the cloud server 1103 is to determine whether the third image can enhance the first image partly, the third image can be matched to a part of the first image. If the matching degree between the third image and the part of the first image is greater than or equal to the second preset threshold, it is indicated that the third image can enhance the first image partly.

In an embodiment of the present disclosure, when the mobile terminal 1101 performs the detail enhancement on the first image according to the third image which meets the first preset condition, the third image may be registered to the first image firstly (for example, using common methods such as image edge detection and alignment) to identify feature edges and objects in the images; relative positions of the objects are used to determine whether there exist parts with common contents in the two images and the parts are different from each other and help to align the images; and then, the parts with common contents are aligned according to parameters such as the size, exposure, and angle of rotation of the two images, and the parts with common contents in the two images are fused to finally obtain an image with higher definition.

In addition, due to different shooting angles, there will be parallax between objects. Entity segmentation or semantic segmentation may be used to increase the details of each object with each entity, instead of being limited to a one-time matching algorithm of the whole images, so as to achieve better detail enhancement.

According to the embodiments of the present disclosure, the details of the first image captured by the mobile terminal are enhanced by using the second image captured by the camera fixedly located, so that the first image captured by the mobile terminal becomes clearer, that is, the photographing quality of the mobile terminal is improved. As the camera for capturing the second image is fixedly located and, therefore, need not be carried around by the user, the portability of the mobile terminal is ensured while improving the photographing quality of the mobile terminal.

Figure 12:
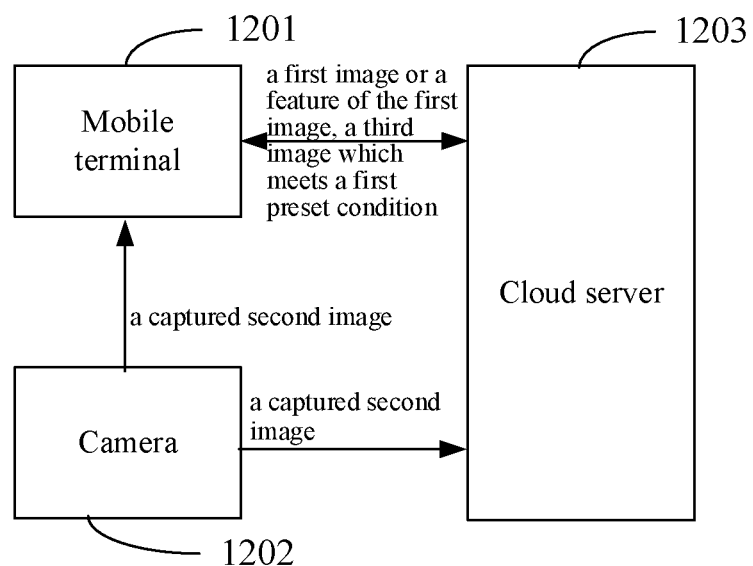
FIG. 12 is a schematic diagram of the structure of a photographing system according to another embodiment of the present disclosure.

Referring to FIG. 12, another embodiment of the present disclosure provides a photographing system, including a mobile terminal 1201, N camera(s) 1202 arranged on-site and a cloud server 1203, where the mobile terminal 1201 is configured to send a first image or a feature of the first image to the cloud server, where the first image is an image acquired through a built-in camera of the mobile terminal, to establish a connection with one of the camera(s) arranged on-site which meets a second preset condition, to receive a second image captured by the camera which meets the second preset condition, and to perform detail enhancement on the first image according to the received second image; the N camera(s) 1202 arranged on-site is/are configured to periodically send the one or more captured second images to the cloud server, where N is an integer greater than or equal to 1; and the cloud server 1203 is configured to receive the first image or the feature of the first image from the mobile terminal, where the first image is the image acquired through the built-in camera of the mobile terminal, to receive the one or more second images captured by the camera(s) arranged on-site, to determine a camera among the camera(s) which meets a second preset condition according to the one or more captured second images, and to establish a connection between the camera which meets the second preset condition and the mobile terminal, and the camera which meets the second preset condition is further configured to: send the captured second image to the mobile terminal after the connection with the mobile terminal is established, where the second image captured by the camera which meets the second preset condition can enhance the first image partly or entirely.

In an example embodiment, the first image is an image obtained by a preview process during photographing through the built-in camera of the mobile terminal or an image captured by the built-in camera of the mobile terminal.

In an embodiment of the present disclosure, the camera(s) may be located at photogenic spots, popular places for taking pictures, etc., and multiple cameras or only one camera may be arranged at one location according to actual needs.

In another embodiment of the present disclosure, the preset condition includes at least one of: a distance between the camera which meets the second preset condition and the mobile terminal being less than or equal to a first preset threshold; or the second image captured by the camera which meets the second preset condition including no area where confidentiality is required or photography is prohibited.

In an embodiment of the present disclosure, when the cloud server 1203 is to determine whether the second image captured by the camera which meets the second preset condition can enhance the first image partly or entirely, a second image captured by the camera may be matched to the first image, where a capture time interval between the first image and the second image is less than or equal to the preset time interval. If the matching degree between the two images is greater than or equal to the second preset threshold, it is indicated that the camera meets the second preset condition; or, it is determined whether the second image can enhance the first image partly, and if the answer is yes, it is indicated that the camera meets the second preset condition.

In an embodiment of the present disclosure, when the cloud server 1203 is to determine whether the second image can enhance the first image partly, the second image can be matched to a part of the first image. If the matching degree between the second image and the part of the first image is greater than or equal to the second preset threshold, it is indicated that the second image can enhance the first image partly.

In an embodiment of the present disclosure, when the cloud server 1203 is to perform the detail enhancement on the first image according to the received second image captured by the camera which meets the second preset condition, the second image may be registered to the first image firstly (for example, using common methods such as image edge detection and alignment) to identify feature edges and objects in the images; relative positions of the objects are used to determine whether there exist parts with common contents in the two images and the parts are different from each other, and help to align the images; and then, the parts with common contents are aligned according to parameters such as the size, exposure, and angle of rotation of the two images, and the parts with common contents in the two images are fused to finally obtain an image with higher definition.

In addition, due to different shooting angles, there will be parallax between objects. Entity segmentation or semantic segmentation may be used to increase the details of each object with each entity, instead of being limited to a one-time matching algorithm of the whole images, so as to achieve better detail enhancement.

The embodiment of the present disclosure includes the following steps: sending a first image or a feature of the first image to a cloud server, where the first image is an image acquired through a built-in camera of a mobile terminal; receiving from the cloud server a third image which is determined based on one or more second images captured by one or more cameras arranged on-site and meets a first preset condition, and performing detail enhancement on the first image according to the third image which meets the first preset condition, where the first preset condition includes: a capture time interval between the third image and the first image being less than or equal to a preset time interval, and the third image can be utilized to enhance the first image partly or entirely. According to the embodiments of the present disclosure, the details of the first image captured by the mobile terminal are enhanced by using the second image captured by the camera arranged on-site, so that the first image captured by the mobile terminal becomes clearer, that is, the photographing quality of the mobile terminal is improved. As the user need not carry around the camera for capturing the second image, the portability of the mobile terminal is ensured while improving the photographing quality of the mobile terminal.

It can be understood by those having ordinary skills in the art that all or some of the steps of the methods, systems, and functional modules/units in the devices disclosed above can be implemented as software, firmware, hardware, and appropriate combinations thereof. In the hardware implementation, the division between functional modules/units mentioned in the above description does not necessarily correspond to the division of physical components; for example, a physical component may have multiple functions, or a function or step may be performed cooperatively by several physical components. Some or all of the components may be implemented as software executed by a processor, such as a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As well known to those of ordinary skill in the art, the term computer storage medium includes volatile and nonvolatile, removable and non-removable media implemented in any method or technology for storing information, such as computer-readable instructions, data structures, program modules, or other data. A computer storage medium includes, but is not limited to, RAM, ROM, EEPROM, flash memory or other memory technologies, CD-ROM, digital versatile disk (DVD) or other optical disk storage, cassettes, magnetic tapes, magnetic disk storage, or other magnetic storage devices, or any other medium which can be configured to store desired information and can be accessed by a computer. Furthermore, it is well known to those of ordinary skill in the art that communication media typically contain computer-readable instructions, data structures, program modules, or other data in a modulated data signal such as a carrier wave or other transmission mechanism, and can include any information delivery media.

While the embodiments disclosed in the embodiments of the present disclosure are described above, these embodiments are only for facilitating understanding of the embodiments of the present disclosure and are not used for limiting the embodiments of the present disclosure. Those having ordinary skills in the art can make any modification and change in the implementations and details without departing from the principal and scope of the embodiments of the present disclosure, but the scope of protection of the embodiments of the present disclosure shall still be subject to the scope defined by the appended claims.

The invention claimed is:

1. A photographing method applicable to a mobile terminal, the method comprising: sending a first image or a feature of the first image to a cloud server, wherein the first image is an image acquired through a built-in camera of the mobile terminal; and receiving a third image from a cloud server, which is determined by the cloud server, in response to meeting a first preset condition based on a second image captured by a public camera that is fixedly located, and performing detail enhancement on the first image according to the third image which meets the first preset condition, wherein the first preset condition comprises: a capture time interval between the third image and the first image being less than or equal to a preset time interval so that the first image after detail enhancement based on the third image keeps a reflection of the actual content, and the third image being able to be utilized to enhance the first image partly or entirely, wherein performing detail enhancement on the first image includes: aligning parts with common contents of the third image and the first image; and fusing the parts with common contents to obtain higher definition of the parts with common contents of the first image.

2. The method of claim 1, wherein the first preset condition further comprises at least one of: a distance between the camera which captures the second image and the mobile terminal being less than or equal to a first preset threshold; or the third image being free of an area where confidentiality is required or photography is prohibited.

3. The method of claim 1, wherein the third image being able to be utilized to enhance the first image partly or entirely comprises one of:
   a matching degree between the third image and the first image or the feature of the first image being greater than or equal to a second preset threshold; or
   the third image being able to be utilized to enhance the first image partly.

4. A photographing device, comprising a processor and a non-transitory computer-readable storage medium storing instructions which, when executed by the processor, cause the processor to perform a photographing method of claim 1.

5. A non-transitory computer-readable storage medium storing a computer program which, when executed by a processor, causes the processor to perform the steps of a photographing method of claim 1.

6. A photographing method applicable to a cloud server, the method comprising:
   receiving a first image or a feature of the first image from a mobile terminal, wherein the first image is an image acquired through a built-in camera of the mobile terminal;
   receiving a second image captured by a public camera that is fixedly located; and
   in response to a determination, based on the captured second image, of a third image which meets a first preset condition, sending the third image which meets the first preset condition to the mobile terminal, wherein the first preset condition comprises: a capture time interval between the third image and the first image being less than or equal to a preset time interval so that the first image after detail enhancement based on the third image keeps a reflection of the actual content, and the third image being able to be utilized to enhance the first image partly or entirely, wherein performing detail enhancement on the first image includes: aligning parts with common contents of the third image and the first image; and fusing the parts with common contents to obtain higher definition of the parts with common contents of the first image.

7. The method of claim 6, wherein the first preset condition further comprises at least one of: a distance between the camera which captures the second image and the mobile terminal being less than or equal to a first preset threshold; or the third image being free of an area where confidentiality is required or photography is prohibited.

8. The method of claim 6, wherein the third image being able to be utilized to enhance the first image partly or entirely comprises one of: a matching degree between the third image and the first image or the feature of the first image being greater than or equal to a second preset threshold; or the third image being able to be utilized to enhance the first image partly.

9. The method of claim 6, wherein determining, based on the captured second image, a third image which meets a first preset condition comprises:
   in response to the captured second image meeting the first preset condition, selecting the second image which meets the first preset condition as the third image which meets the first preset condition; or
   converting the captured second image into a third image, wherein an included angle between a shooting orientation of the third image and a shooting orientation of the first image is less than or equal to a third preset threshold; and in response to the converted third image meeting the first preset condition, selecting the converted third image as the third image which meets the first preset condition.

10. A photographing device, comprising a processor and a non-transitory computer-readable storage medium storing instructions which, when executed by the processor, cause the processor to perform a photographing method of claim 6.

11. A non-transitory computer-readable storage medium storing a computer program which, when executed by a processor, causes the processor to perform the steps of a photographing method of claim 6.

* * * * *